US012355582B2

(12) United States Patent
Patel (10) Patent No.: US 12,355,582 B2
(45) Date of Patent: *Jul. 8, 2025

(54) SYSTEMS FOR CAPTURING MESSAGING VOLUME AND UTILIZATION METRICS WITHIN A MULTICAST MESSAGING SERVICE (71) Applicant: BANK OF AMERICA CORPORATION, Charlotte, NC (US)

(72) Inventor: Milan Bansilal Patel, Singapore (SG)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,598

(22) Filed: Apr. 16, 2024

(65) Prior Publication Data

US 2024/0267246 A1 Aug. 8, 2024

Related U.S. Application Data (63) Continuation of application No. 17/554,312, filed on Dec. 17, 2021, now Pat. No. 12,034,557.

(51) Int. Cl.
H04L 12/18 (2006.01)
H04L 43/10 (2022.01)

(52) U.S. Cl.
CPC ........ *H04L 12/185* (2013.01); *H04L 12/1845* (2013.01); *H04L 43/10* (2013.01)

(58) Field of Classification Search
CPC ... H04L 12/185; H04L 12/1845; H04L 43/10; H04L 12/1863; H04L 43/045; H04L 43/062; H04L 43/0876
See application file for complete search history.

(56) References Cited

U.S. PATENT DOCUMENTS

| 6,148,335 | A  | 11/2000 | Haggard et al. |
| 6,665,725 | B1 | 12/2003 | Dietz et al. |
| 7,529,241 | B2 | 5/2009  | Milligan et al. |
| 7,594,009 | B2 | 9/2009  | Triulzi et al. |
| 8,248,928 | B1 | 8/2012  | Wang et al. |
| 8,503,289 | B2 | 8/2013  | Dholakia et al. |
| 9,338,104 | B2 | 5/2016  | Bugenhagen |

(Continued)

*Primary Examiner* — Kibrom T Hailu
(74) *Attorney, Agent, or Firm* — Moore & Van Allen PLLC; Anup Iyer (57) ABSTRACT A comprehensive system for capturing multicast messaging traffic volume and performance metrics across a global inventory of hosts. A single instance of the data capturing and extraction tool may be configured to be implemented across an enterprise's entire inventory of multicast messaging-configured hosts. The data capturing and extraction tool dynamically extracts multicast group addresses and corresponding metrics during the scanning of the captured traffic volume and performance data, thus eliminating the need for manual input of specified multicast group addresses. As a result, presentation of metrics on a per multicast group address basis is made possible for all multicast group addresses extracted during the scanning process. In addition, an efficient means for polling the hosts for traffic volume and performance data is realized by only polling those non-primary and workstation hosts that are currently transmitting or receiving multicast messages.

20 Claims, 7 Drawing Sheets (56) References Cited

U.S. PATENT DOCUMENTS

| | | | |
|---|---|---|---|
| 9,602,296 B2 | 3/2017 | Wu et al. | |
| 10,027,496 B2 | 7/2018 | Lemoine | |
| 10,637,760 B2 | 4/2020 | Jadallah et al. | |
| 12,034,557 B2* | 7/2024 | Patel | H04L 43/062 |
| 2006/0200711 A1 | 9/2006 | Schondelmayer et al. | |
| 2007/0091889 A1* | 4/2007 | Xiao | H04L 45/00 |
| | | | 370/312 |
| 2010/0020715 A1 | 1/2010 | Monaco et al. | |
| 2018/0115482 A1 | 4/2018 | Kelley, Jr. | |
| 2018/0115982 A1* | 4/2018 | Reddy | H04B 17/318 |
| 2019/0158368 A1 | 5/2019 | Cociglio | |
| 2019/0386931 A1* | 12/2019 | Sinha | H04L 67/306 |
| 2021/0385149 A1 | 12/2021 | Suryanarayana et al. | |

* cited by examiner

Services

| Service | Network | Hosts | Clients |
|---|---|---|---|
| 25173 | "Host IP Address", "Recipient Group Address(es)", "Sender Group Address" | 2 | 1 |
| 18888 | "Host IP Address", "Recipient Group Address(es)", "Sender Group Address" | 7 | 3 |

242-B

Service Information (18888) — 250 service: 18888
network: "Host IP Address", "Recipient Group Address(es)", "Sender Group Address"
reliability: 60 seconds
creation: 2020-11-05 (04:15:05)
clients: 3
hosts: 7
subscribers: 9
communication ID: 0

Inbound Rates (per second)

| msgs | bytes | pkts |
|---|---|---|
| 3.6 | 2594.0 | 5.1 |

Outbound Rates (per second)

| msgs | bytes | pkts |
|---|---|---|
| 9.9 | 7459.8 | 1.4 |

Inbound Counts

| msgs | bytes |
|---|---|
| 1124456 | 426240449 |

Outbound Counts

| msgs | bytes |
|---|---|
| 1343735 | 589044184 |

Inbound Packet Totals

| pkts | missed | lost MC | lost PTP | suppressed MC | bad pkts |
|---|---|---|---|---|---|
| 176777 | 7 | 0 | 0 | 0 | 0 |

Outbound Packet Totals

| pkts | retrans | lost MC | lost PTP | shed MC | bad retrseqs |
|---|---|---|---|---|---|
| 705613 | 64 | 0 | 0 | 0 | 0 |

242-C

Host List Service 18888

| Hostname | IP address | Version | Serial | Uptime |
|---|---|---|---|---|
| Host 1 name (workstation) | xxx.xx.xxxxx.xxx | 8.4.6 | 83901 | 01:30:17 |
| Host 2 name (workstation) | xxx.xx.xxxxx.xxx | 8.4.6 | 83901 | 06:50:45 |
| Host 3 name (workstation) | xxx.xx.xxxxx.xxx | 8.4.6 | 83901 | 06:09:19 |
| Host 4 name (workstation) | xxx.xx.xxxxx.xxx | 8.4.6 | 83901 | 10:05:07 |
| Host 5 name (workstation) | xxx.xx.xxxxx.xxx | 8.4.6 | 83901 | 10:42:16 |
| Host 6 name (server) | xxx.xx.xxxxx.xxx | 8.4.6 | 85951 | 301:56:23 |
| Host 7 name (workstation) | xxx.xx.xxxxx.xxx | 8.4.6 | 85951 | 465:37:12 |

SYSTEMS FOR CAPTURING MESSAGING VOLUME AND UTILIZATION METRICS WITHIN A MULTICAST MESSAGING SERVICE

CROSS-REFERENCE TO RELATED APPLICATION

This application is a continuation of and claims priority to U.S. patent application Ser. No. 17/554,312 filed Dec. 17, 2021 of the same title; the contents of which are also incorporated herein by reference.

FIELD OF THE INVENTION

The present invention is generally related to multicast messaging and, more specifically, globally capturing volume and utilization/performance metrics from a plurality of hosts running a multicast daemon that is configured to send and receive multicast messages via group multicast addresses.

BACKGROUND

Multicast messaging uses User Datagram Protocol (UDP) (i.e., point-to-point communication) to communicate messages between hosts (e.g., server, workstation or the like). To receive a multicast message a host must be configured to receive messages on a specific multicast address. All hosts that are configured to receive messages from a particular address are part of a multicast group (i.e., a multicast group address).

Typically, multicasting messaging is not enabled within the network layer to allow for messages to communicated internationally. In other words, multicast messaging is limited to intranational communication (i.e., the senders and recipients have to be within one countries borders in order to receive and send messages from a specific multicast group address). Such isolated messaging infrastructures poses difficulties in terms of being able to capture multicast messaging traffic volumes and other performance metrics/indicators globally. In many instances, known multicast metric capturing systems have to be deployed within each country of operation, since the multicast packets are not transmitted beyond the borders of a particular country.

Moreover, known multicast metric capturing systems are limited in the form in which metrics can be generated. Specifically, known multicast metric capturing systems require manual input of multicast group addresses to be able to generate metrics on a per multicast group address basis. In other words, the known systems must be aware of the multicast group address, in advance, in order for metrics to be generated that are specific to a multicast group address.

Therefore, a need exists to develop systems, methods, computer program products and the like that provide for capturing multicast messaging traffic volume and performance metrics within a global infrastructure. In this regard, the desired systems, methods, computer program products and the like should be capable of acquiring traffic volume and performance metric data from hosts physically located anywhere, such that the resulting metrics reflect the entire inventory of hosts within a worldwide enterprise. Moreover, the desired system, methods, computer program products and the like should be capable of dynamically identifying multicast group addresses within the traffic volume and performance metric data so that metrics can be rendered for all active multicast group addresses without the need for manual input of individual multicast group addresses.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing a comprehensive system for capturing, extracting and, in some embodiments, presenting multicast messaging traffic volume and performance metrics across a global inventory of hosts. In this regard, the present invention may be configured such that only a single instance of the data capture and extraction tool is implemented across an enterprise's entire inventory of multicast messaging-configured hosts.

Additionally, the present invention is capable of dynamically extracting multicast group addresses and corresponding metrics during the scanning of the captured traffic volume and performance data. Since the active multicast group addresses are extracted during the scan process, the invention eliminates the need for manual input of specified multicast group addresses and provides for dynamic presentation of metrics on a per multicast group address basis for all multicast group addresses extracted during the scanning process.

Moreover, the present invention provides for an efficient means for polling the hosts for active services (e.g., communication channels, also referred to in multicast as "transports") and their corresponding metrics, whereby only hosts that are deemed to be currently active (i.e., currently transmitting or receiving multicast messages) are polled. According to the invention, such polling efficiency is realized by identifying, during the scanning of captured traffic volume and performance data, currently active hosts and constructing dynamic polling queues that include the identified active hosts. As a result, each polling queue includes a predetermined group of hosts (e.g., primary servers) as well as the hosts (e.g., non-primary servers and workstations) identified as being currently active by the scan process. This procedure eliminates the need to poll all of the hosts capable of multicast messaging and, instead, focuses on polling only those hosts which are key to the overall messaging service and those which are deemed to be currently active. Since the dynamic queue process is iterative (i.e., conducted between each polling interval) the queue data is not retained and new polling queues are formed prior to every polling interval.

In additional embodiments of the invention, the metrics are communicated to a separate reporting/dashboard mechanism which is configured to generate metric reports and present dashboard presentations of metrics on a per multicast group basis, a per service/transport basis, a per multicast daemon basis, and/or a per host basis. The metrics may include but are not limited to, inbound and outbound messaging rates, inbound and outbound message/bytes counts and inbound and outbound packet totals. Since some of the multicasting services will implement procedures for retransmission of lost/dropped data packets, the packet totals may include for inbound traffic, (i) missed data packets, (ii) lost multicast data packets, (iii) suppressed data packets, and/or (iv) corrupt data packets and for outbound traffic (i) retransmitted data packets, (ii) lost multicast data packets, (iii) shed multicast data packets and/or (iv) unreadable retransmission data packets.

A system for capturing metric data within a multicast messaging service defines first embodiments of the invention. The system includes a plurality of globally located hosts (i.e., physically located in more than one country). Each host includes a first memory and one or more first processing devices in communication with the first memory. The first memory stores one or more multicasting daemons. Each multicasting daemon is executable by at least one of the one or more first processing devices and configured to send and receive multicast messages via a multicast group address. The system additionally includes a first computing platform including a second memory and one or more second processing devices in communication with the second memory. The second memory stores a multicast service metric data capture and extraction tool that includes first instructions that are executable by at least one of the one or more second processing devices. The first instructions are configured to poll, a predetermined subset of hosts from amongst the plurality of hosts, for multicast message metric data. In response to the polling and receiving multicast message metric data from one or more of the subset of hosts, the first instructions are configured to scan the multicast message metric data to dynamically (i) extract one or more multicast group addresses and corresponding metrics associated with each of the one or more multicast group addresses, and (ii) identify one or more secondary hosts from amongst the plurality of hosts that are not included in the first subset of hosts and are currently sending or receiving multicast messages (i.e., currently active). The first instructions are further configured to construct a polling queue that includes the predetermined subset of hosts and the one or more secondary hosts, and, at a predetermined time interval, poll the hosts included in the polling queue for multicast message metric data.

In specific embodiments of the system, the polling, scanning and construction of polling queues occurs iteratively. In this regard, first instructions are further configured, in response to receiving second multicast message metric data from one or more of the hosts included in the polling queue, scan the second multicast message metric data to dynamically (i) extract one or more multicast group addresses and corresponding metrics associated with each of the one or more multicast group addresses, and (ii) identify one or more secondary hosts from amongst the plurality of hosts that are not included in the first subset of hosts and are currently sending or receiving multicast messages. Further, the first instructions are further configured construct another polling queue that includes the predetermined subset of hosts and the one or more secondary hosts, and, at the predetermined time interval, poll the hosts included in the other polling queue for multicast message metric data.

In further specific embodiments of the system, the predetermined subset of hosts are defined as primary servers as designated by the controlling entity/enterprise and the secondary hosts are defined as the non-primary servers and workstations (e.g., personal computing devices, laptops and the like).

In additional specific embodiments of the invention, the first instructions configured to poll the hosts for multicast metric data are further configured to check for, within the multicasting daemon, and retrieve Hypertext Transfer Protocol (HTTP) interface pages that indicate one or more active services. In such embodiments the HTTP interface pages may include, but are not limited to Service, Service Information, and Host List HTTP interface pages. Thus, according to related embodiment of the system, the first instructions configured to scan the multicast message metric are further configured to scan Service, Service Information, and Host List HTTP interface pages retrieved from the multicasting daemons.

In other specific embodiments of the invention, the corresponding metrics associated with each of the one or more multicast group addresses include one or more of (i) inbound rates for receiving messages, (ii) outbound rates for sending messages, (iii) inbound message and bytes counts, (iv) outbound message and byte counts, (v) inbound data packet totals, and (vi) outbound data packet totals.

Moreover, in additional embodiments, the system further includes a second computing platform including a third memory and one or more third processing devices in communication with the third memory. The third memory stores a multicast service metric reporting and dashboard presentation module. The module includes second instructions that are executable by at least one of the one or more second processing devices. The module is configured to receive the multicast message metric data including the extracted one or more multicast group addresses and corresponding metrics associated with each of the one or more multicast group addresses, and, in response, generate a dashboard presentation that provides for multicast message metric data to be displayed on, at least one of, a (i) per multicast group address basis, (ii) per service basis, (iii) per multicast daemon basis, and (iv) per host basis. In related embodiments of the system, the second instructions are further configured to generate the that provides for a graphical representation of the average and total inbound and outbound bytes per time interval on a (i) per multicast group address basis, (ii) per service basis, (iii) per multicast daemon basis, and/or (iv) per host basis.

A computer-implemented method for capturing metric data within a multicast messaging service defines second embodiments of the invention. The computer-implemented method is executed by one or more processing devices. The computer-implemented method includes polling, a predetermined subset of hosts from amongst a plurality of hosts, for multicast message metric data, The plurality of hosts are physically located globally and store at least one multicasting daemon configured for sending and receiving multicast messages via a multicast group address. In addition, the computer-implemented method includes, in response to receiving multicast message metric data from one or more of the subset of hosts, scanning the multicast message metric data to dynamically (i) extract one or more multicast group addresses and corresponding metrics associated with each of the one or more multicast group addresses, and (ii) identify one or more secondary hosts from amongst the plurality of hosts that are not included in the first subset of hosts and are currently sending or receiving multicast messages. In response to the scanning, the computer-implemented method includes constructing a polling queue that includes the predetermined subset of hosts and the one or more secondary hosts, and, at a predetermined time interval, polling the hosts included in the polling queue for multicast message metric data.

In specific embodiments of the computer-implemented method, the polling, scanning and polling queue construction are performed iteratively. In this regard, the method may further include, in response to receiving second multicast message metric data from one or more of the hosts included in the polling queue, scanning the second multicast message metric data to dynamically (i) extract one or more multicast group addresses and corresponding metrics associated with each of the one or more multicast group addresses, and (ii) identify one or more secondary hosts from amongst the plurality of hosts that are not included in the first subset of hosts and are currently sending or receiving multicast messages. In addition, the method may include constructing another polling queue that includes the predetermined subset of hosts and the one or more secondary hosts, and, at the predetermined time interval, polling the hosts included in the other polling queue for multicast message metric data.

In alternate embodiments of the computer-implemented method, the hosts in the predetermined subset of hosts are defined as predetermined primary servers, and the one or more secondary hosts are defined as non-primary servers and workstations.

In other specific embodiments of the computer-implemented method, polling the predetermined subset of hosts of the plurality of hosts for multicast metric data further includes checking for, within the multicasting daemon of the subset of hosts, and retrieving Hypertext Transfer Protocol (HTTP) interface pages that indicate an active service. In such embodiments of the computer-implemented method, polling the hosts included in the other polling queue for multicast message metric data further includes checking for, within the multicasting daemon of the hosts included in the polling queue, and retrieving Hypertext Transfer Protocol (HTTP) interface pages that indicate an active service. In related embodiments of the computer-implemented method, scanning the multicast message metric data further includes scanning Service, Service Information and Host List HTTP interface pages retrieved from hosts having one or more active services.

In other specific embodiments of the computer-implemented method, the corresponding metrics associated with each of the one or more multicast group addresses include one or more of (i) inbound rates for receiving messages, (ii) outbound rates for sending messages, (iii) inbound message and bytes counts, (iv) outbound message and byte counts, (v) inbound data packet totals, and (vi) outbound data packet totals.

In still further embodiments the computer-implemented method includes receiving, at a dashboard module, the multicast message metric data including the extracted one or more multicast group addresses and corresponding metrics associated with each of the one or more multicast group addresses. In addition, the computer-implemented method includes building, at the dashboard module, a dashboard presentation that provides for multicast message metric data to be displayed on a (i) per multicast group address basis, (ii) per service basis, (iii) per multicast daemon basis, and (iv) per host basis.

A computer program product including a non-transitory computer-readable medium defines third embodiments of the invention. The non-transitory computer-readable medium includes a first set of codes for causing a computer to poll, a predetermined subset of hosts from amongst a plurality of hosts, for multicast message metric data. The plurality of hosts are globally located and store at least one multicasting daemon configured for sending and receiving multicast messages via a multicast group address. The computer-readable medium additionally includes a second set of codes for causing a computer to, in response to receiving multicast message metric data from one or more of the subset of hosts, scan the multicast message metric data to dynamically (i) extract one or more multicast group addresses and corresponding metrics associated with each of the one or more multicast group addresses, and (ii) identify one or more secondary hosts from amongst the plurality of hosts that are not included in the first subset of hosts and are currently sending or receiving multicast messages. In addition, the computer-readable medium includes a third set of codes for causing a computer to construct a polling queue that includes the predetermined subset of hosts and the one or more secondary hosts, and a fourth set of codes for causing a computer to, at a predetermined time interval, poll the hosts included in the polling queue for multicast message metric data.

In specific embodiments of the computer program instructions the first-fourth instructions are configured to be executed iteratively. In this regard, the second set of codes are further configured to cause the computer to, in response to receiving second multicast message metric data from one or more of the hosts included in the polling queue, scan the second multicast message metric data to dynamically (i) extract one or more multicast group addresses and corresponding metrics associated with each of the one or more multicast group addresses, and (ii) identify one or more secondary hosts from amongst the plurality of hosts that are not included in the first subset of hosts and are currently sending or receiving multicast messages. The third set of codes are further configured to cause the computer to construct another polling queue that includes the predetermined subset of hosts and the one or more secondary hosts. The fourth set of codes are further configured to cause the computer to, at the predetermined time interval, poll the hosts included in the other polling queue for multicast message metric data.

In further specific embodiments of the computer program product, the first set of codes is further configured to cause the computer to poll the predetermined subset of hosts, wherein the subset are defined as predetermined primary servers, and the second set of codes is further configured to cause the computer to scan the multicast metric data to dynamically identify one or more secondary hosts, wherein the one or more secondary hosts are defined as non-primary servers and workstations.

In additional specific embodiments of the computer program product, the first set of codes are further configured to cause the computer to check for, within the multicasting daemon, and retrieve Hypertext Transfer Protocol (HTTP) interface pages that indicate an active service and the second set of codes are further configured to cause the computer to check for, within the multicasting daemon, and retrieve Hypertext Transfer Protocol (HTTP) interface pages that indicate an active service.

Moreover, in additional specific embodiments of the computer program product, the second set of codes are further configured to cause the computer scan Service, Service Information and Host List HTTP interface pages retrieved from hosts having one or more active services.

Thus, according to embodiments of the invention, which will be discussed in greater detail below, the present invention addresses needs and/or achieves other advantages by providing a comprehensive system for capturing multicast messaging traffic volume and performance metrics across a global inventory of hosts. In this regard, the present invention may be configured such that only a single instance of the data capture and extraction tool is implemented across an enterprise's entire inventory of multicast messaging-configured hosts. Additionally, the present invention is capable of dynamically extracting multicast group addresses and corresponding metrics during the scanning of the captured traffic volume and performance data. Since the active multicast group addresses are extracted during the scan process, the invention eliminates the need for manual input of specified multicast group addresses and provides for dynamic presentation of metrics on a per multicast group address basis for all multicast group addresses extracted during the scanning process.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, generate mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide a comprehensive system for capturing, extracting multicast messaging traffic volume across a global inventory of hosts. In this regard, the present invention may be configured such that only a single instance of the data capture and extraction tool is necessary for capturing and extracting metrics across an enterprise's entire inventory of multicast messaging-configured hosts.

Additionally, the present invention is capable of dynamically extracting multicast group addresses during the scanning of the captured traffic volume and performance data, such that metrics can be presented on a per multicast group address basis. Since the active multicast group addresses are dynamically extracted during the scan process, the invention eliminates the need for manual input of specified multicast group addresses.

Moreover, the present invention provides for an efficient means for polling the hosts for active services (e.g., communication channels, also referred to in multicast as "transports") and their corresponding metrics, whereby only hosts that are deemed to be currently active (i.e., currently transmitting or receiving multicast messages) are polled. According to the invention, such polling efficiency is realized by identifying, during the scanning of captured traffic volume and performance data, which hosts are currently active and constructing dynamic polling queues that include the identified active hosts. As a result, each polling queue includes a predetermined group of hosts (e.g., primary servers) as well as the hosts (e.g., non-primary servers and workstations) identified as being currently active by the scan process. This procedure eliminates the need to poll all of the hosts capable of multicast messaging and, instead, focuses on polling only those hosts which are key to the overall metrics and those which are deemed to be currently active. Since the dynamic queue process is iterative (i.e., conducted between each polling interval) the queue data is not retained and new polling queues are formed prior to every polling interval.

In additional embodiments of the invention, the metrics are communicated to a separate reporting/dashboard mechanism which is configured to generate metric reports and present dashboard presentations of metrics on a per multicast group basis, a per service/transport basis, a per multicast daemon basis, and/or a per host basis. The metrics may include but are not limited to, inbound and outbound messaging rates, inbound and outbound message/bytes counts and inbound and outbound packet totals. Since some of the multicasting services will implement procedures for retransmission of lost/dropped data packets, the packet totals may include for inbound traffic, (i) missed data packets, (ii) lost multicast data packets, (iii) suppressed data packets, and/or (iv) corrupt data packets and for outbound traffic (i) retransmitted data packets, (ii) lost multicast data packets, (iii) shed multicast data packets and/or (iv) unreadable retransmission data packets.

Figure 1:
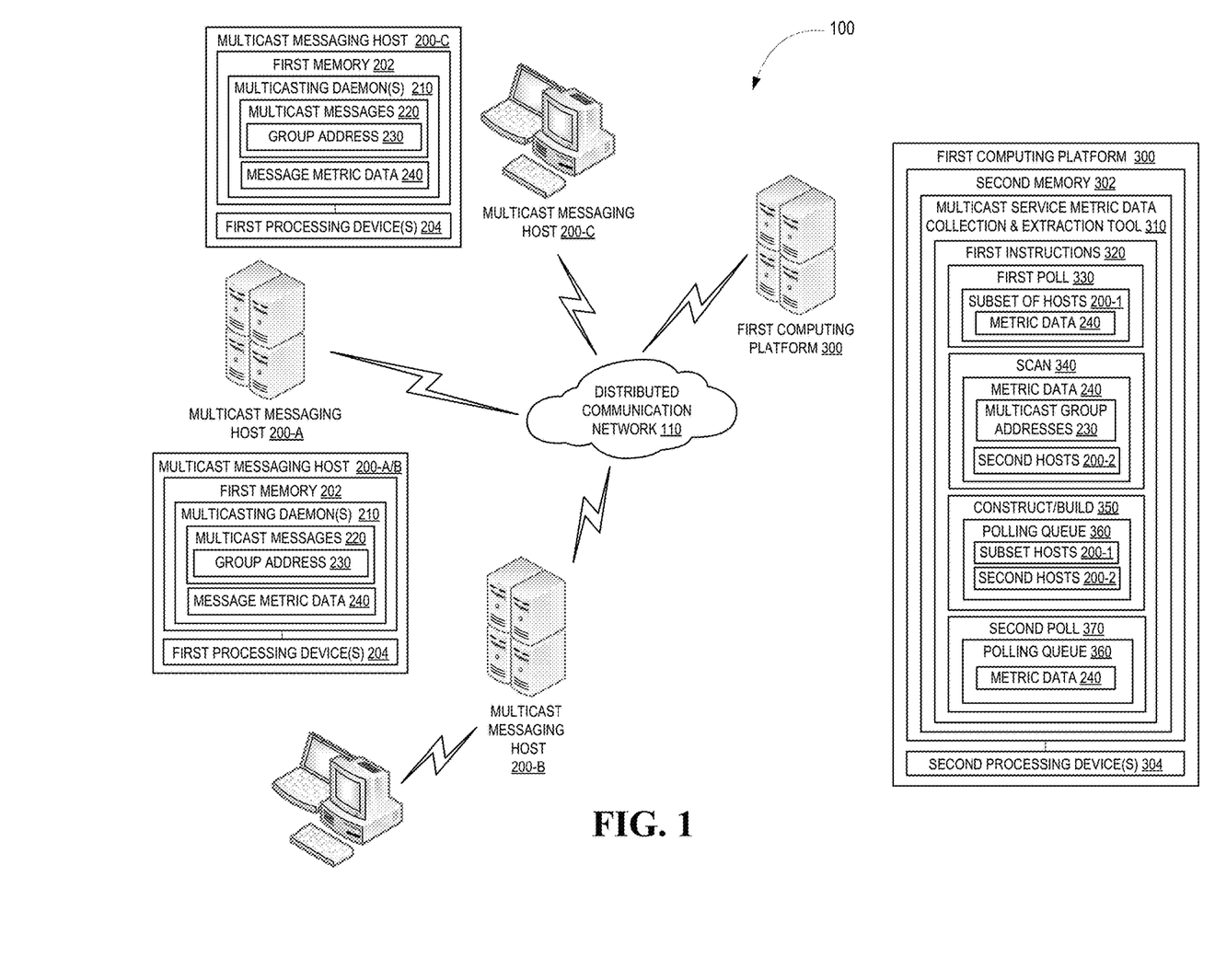
FIG. 1 is a schematic/block of a system for capturing multicast messaging metric data and extracting multicast metrics, in accordance with embodiments of the present invention.

Referring to FIG. 1, a schematic/block diagram is presented of a system 100 for capturing multicast service metric data and extracting metrics therefrom, in accordance with embodiments of the present invention. The system 100 is implemented within a distributed communication network 110 that may include the Internet, one or more intranets, one or more cellular networks, one or more short-range wireless networks or any other wired or wireless communication form.

The system 100 includes a plurality of multicast messaging hosts 200. While FIG. 1 depicts three multicast messaging hosts 200-A, 200-B, 200-C those of ordinary skill in the art of multicast messaging will understand that the plurality will typically include many more multicast messaging hosts 200. For example, in specific embodiments of the invention, multicast messaging hosts 200 comprise all of the hosts within a global enterprise configured for multicast messaging. In the illustrated embodiment of FIG. 1, multicast messaging host 200-A is a server in which the messages are generated by applications executed thereon, multicast messaging host 200-B is a server in which messages are generated by applications being executed by downstream workstations (e.g., personal computers (PCs), laptops or the like) and multicast messaging host 200-C is a workstation (e.g., PC, laptop or the like) in which messages are generated by applications executed thereon.

Additionally, the plurality of multicast messaging hosts 200 are physically located in more than one country and, in most instances, the plurality of multicast messaging hosts 200 are physically located in many different countries throughout the world (i.e., globally). For multicast message communication the hosts communicating over a specific transport (also referred to herein as a communication channel) will reside within the same country, since multicast data packets are not forwarded across international borders. So, for the example shown FIG. 1, if two or more of hosts 2000-A, 200-B and 200-C are physically located in the same country they will be able to communicate with each other via multicast messaging. Conversely, if two of the hosts 2000-A, 200-B and 200-C are physically located in the same country, they will be unable to communicate via multicast messaging, since, as configured, multicast messages are not forwarded across international borders. However, in accordance with embodiments of the present invention, metric data from all of the hosts 200 within a worldwide enterprise's global inventory of hosts can be collected without the need to deploy separate instances of the collection tool in each country where hosts reside. Such global collection of metric data may occur from one centralized location (i.e., one instance of the collection tool) or in other embodiments of the invention collection may occur from multiple locations (i.e., more than one instance of the collection tool deployed within different geographic regions, See, FIG. 6 for example).

Each host 200-A, 200-B, 200-C includes a first memory 202 and one or more first processing device 204 in communication with first memory 202. First memory 202 stores multicasting daemon(s) 210, which are executable by at least one of the first processing devices 204 and configured to send/transmit and receive multicast via a multicast group address. As previously discussed, in multicast messaging, users subscribe to multicast group messages in order to receive any and all messages that are addressed (i.e., broadcasted) using the multicast group address. Additionally, the multicasting daemons 210 store multicast message metric data 240. In specific embodiments of the system, the multicast message metric data 240 is contained within Hypertext Transfer Protocol (HTTP) interface pages.

The system 100 additionally includes a first computing platform 300 having a second memory 302 and at least one second processing device 304 in communication with second memory 302. Second memory 302 stores multicast service metric data collection and metric extraction tool 310 that includes first instructions 320, which are executable by at least one of the second processing devices 304. First instructions 320 are configured to poll (i.e., first poll 330) a predetermined subset of hosts 200-1 from amongst the plurality of multicast messaging hosts 200 for multicast message metric data 240. The predetermined subset of hosts 200-1 being less than the entire inventory of the multicast messaging hosts 200. In response to receiving multicast messaging metric data 240 from one or more of the subset of hosts 200-1, first instructions 320 are further configured to scan 340 the multicast messaging metric data 240 to dynamically extract, along with other metrics, one or more multicast group addresses 230 and corresponding metrics associated with each of the multicast group address(es).

In addition, first instructions 320 configured to scan 340 the multicast messaging metric data 240 are configured to dynamically identify one or more secondary hosts 200-2 from amongst the plurality of multicast messaging hosts 200 that are currently active (i.e., currently sending or receiving multicast messages). As a result, first instructions 320 are configured to construct 350 a polling queue 360 that consists of the predetermined subset of hosts 200-1 and the identified secondary hosts 200-2. At a predetermined interval (e.g., once every 5 minutes or the like), first instructions 320 are configured to poll (i.e., second poll) the hosts 200-1, 200-2 included in the polling queue 360 for multicast message metric data 240. The process of polling hosts 200-1, 200-2 in the polling queue, scanning the multicast message metric data 240 returned from the polled hosts 200-1, 200-2 and constructing the polling queue 360 occurs iteratively and continuously, such that new polling queues 360 are constantly being constructed that include the predetermined subset of hosts 200-1 and the secondary hosts 200-2 deemed to be currently active based by the multicast messaging metric data 240 returned from the last-in-time polling process.

Figure 2:
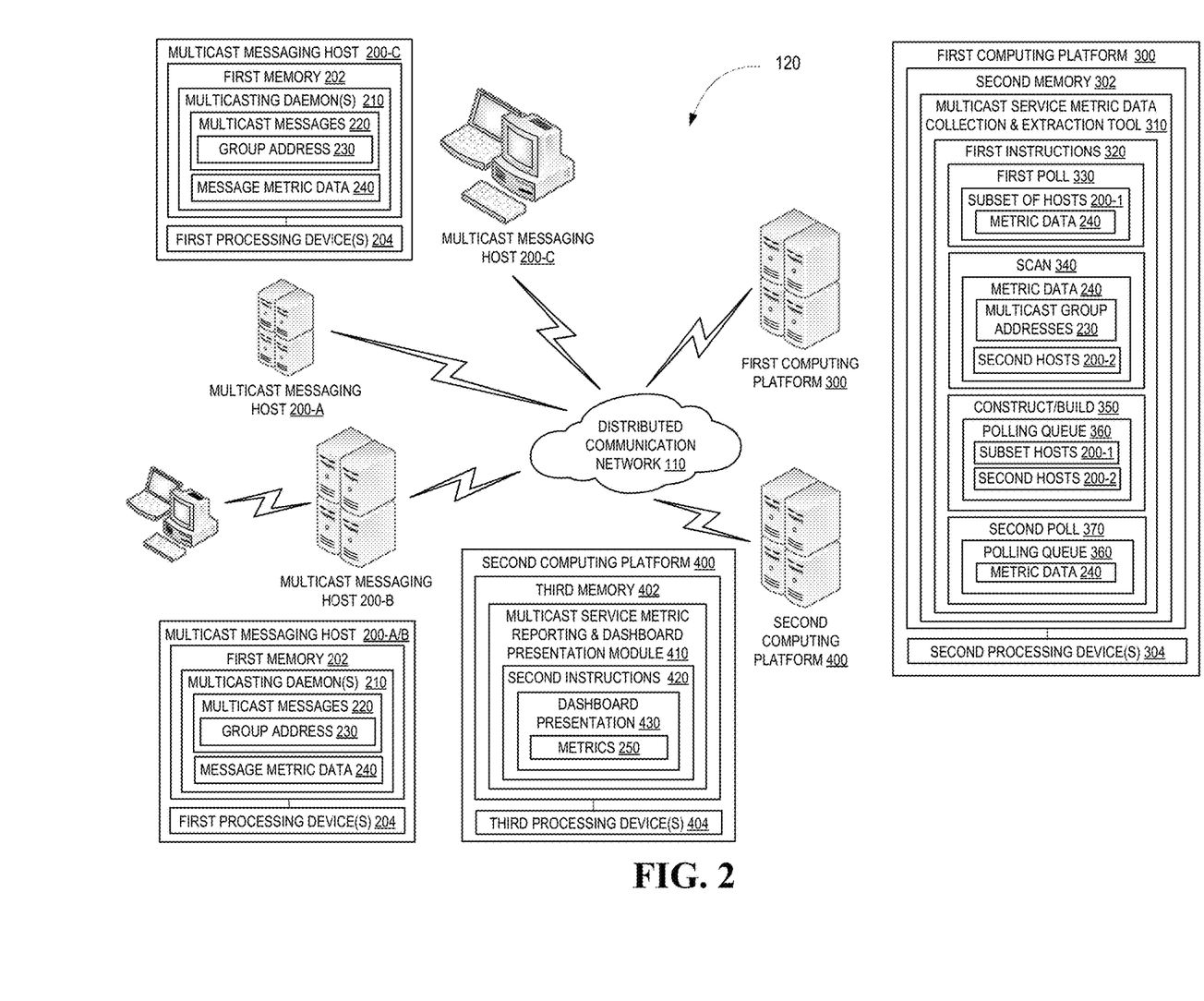
FIG. 2 is a schematic/block diagram of a system for capturing multicast messaging metric data, extracting multicast metrics, and presenting the metrics in a dashboard presentation, in accordance with embodiments of the present invention.

Referring to FIG. 2, a schematic/block diagram is presented of an alternate system 120 for collecting multicast message metric data, extracting metrics from the data and presenting the metrics, in accordance with embodiments of the present invention. The system 120 includes both the plurality of multicast messaging hosts 200 and the first computing platform 300 discussed in relation to FIG. 2. The system 120 additionally includes a second computing platform 400 that is in network communication with the first computing network 300 via distributed communication network 110. In specific embodiments of the invention, second computing platform 400 is a third-party computing platform operated by a different entity than the first computing platform (i.e., multicast service metric data collection and extractions tool 310). In such embodiments of the invention, since the reporting and presentation of the metrics 250 is performed to a third party entity, there is no need for the entity in control of the service metric data collection and extractions tool 310 (i.e., the entity in control if the multicast messaging host) to permanently store/house the metrics within the first computing platform or elsewhere.

Figure 5:
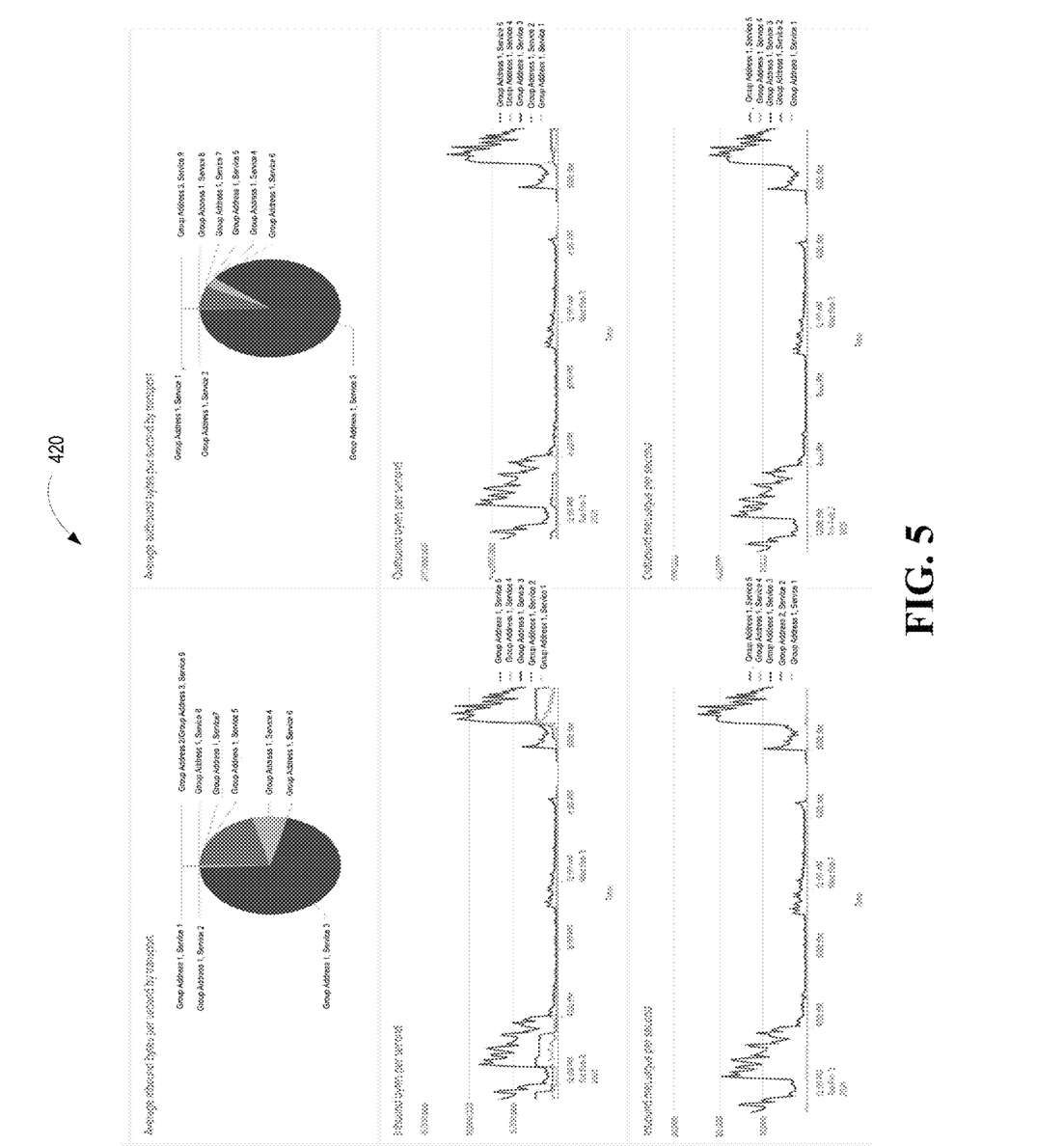
FIG. 5 is an example of a dashboard presentation of multicast metrics, in accordance with alternate embodiments of the invention.

Second computing platform 400 includes third memory 402 and at least one third processing device 404 in communication with third memory 402. Third memory 402 stores multicast service metric reporting and dashboard presentation module 410 that includes second instructions 420, which are executable by at least one of the third processing devices 404. Second instructions 420 are configured to, receive metrics 250 from multicast service metric data collection and extractions tool 310 including multicast group addresses 230 and corresponding metrics associated with each of the multicast group addresses 230. In response to receiving the metrics 250, second instructions 420 are configured to build one or more dashboard presentations 430 that provide for the metrics 250 to be presented on a (i) per multicast group address basis, (ii) per service (i.e., communication channel) basis, (iii) per multicast daemon basis and/or (iv) per multicast messaging host basis. In specific embodiments of the invention, multicast service metric reporting and dashboard presentation module 410 is configured to present preconfigured dashboard presentations. While in other embodiments of the invention, the dashboard presentations may be configured by user inputs (e.g., specific to an inputted multicast group address, service, multicasting daemon, host or the like). In example of a dashboard presentation is depicted in FIG. 5, which will be discussed infra.

Further, second instructions 420 are configured to generate and initiate the electronic dissemination of metric reports. In specific embodiments of the invention, multicast service metric reporting and dashboard presentation module 410 is configured to generate preconfigured, generic reports. While in other embodiments of the invention, the reports may be configured by user inputs.

Figure 3:
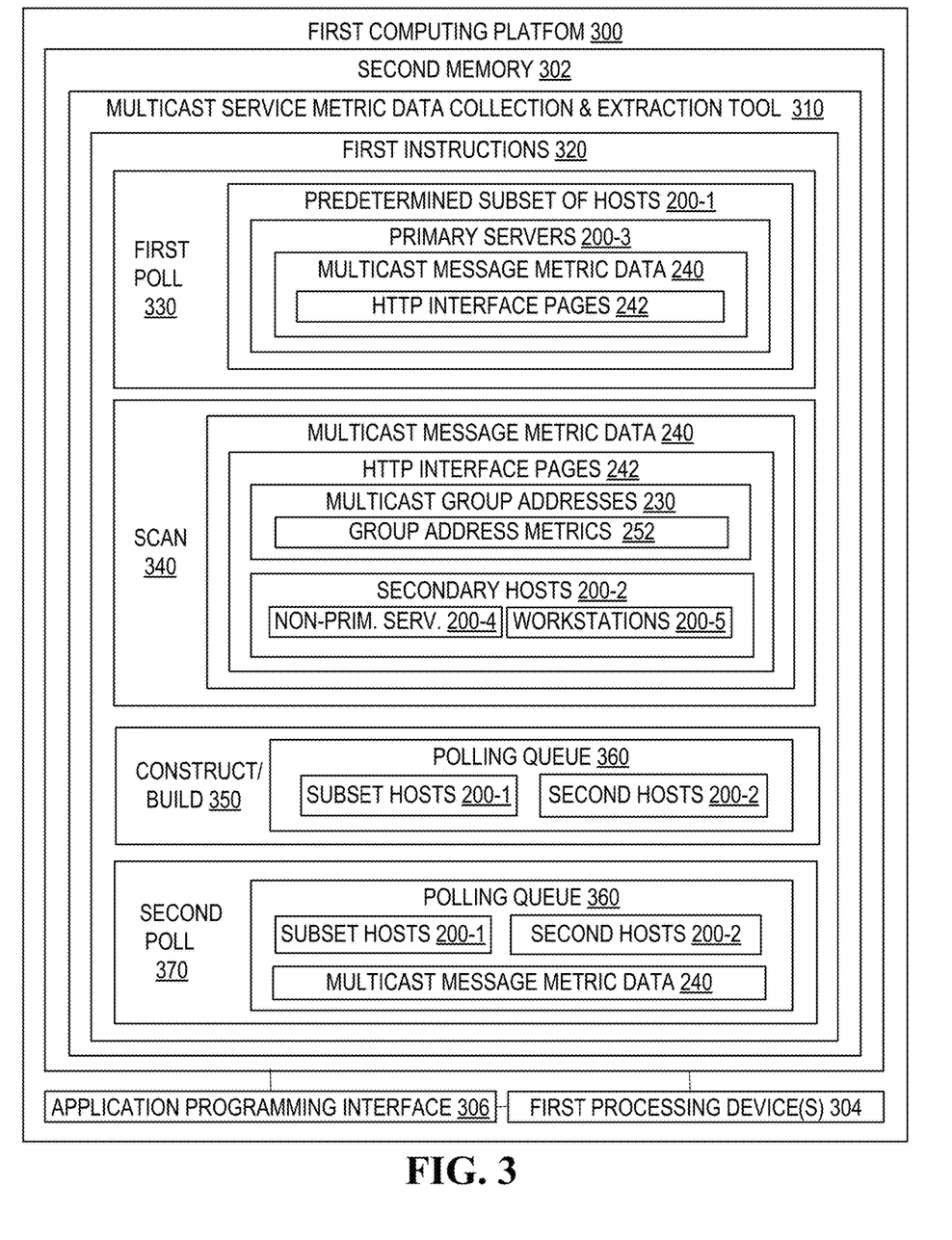
FIG. 3 is a block diagram of a computing platform including a multicast service metric data capture and extraction tool, in accordance with embodiments of the present invention.

Referring to FIG. 3, a block diagram is presented of first computing platform 300 including multicast service metric data collection and extractions tool 310, in accordance with alternate embodiments of the invention. First computing platform 300 comprises one or more computing devices/apparatus, such as application servers or the like configured to execute software programs, including instructions, engines, algorithms, modules, routines, applications, tools, and the like. First computing platform 300 includes second memory 302, which may comprise volatile and non-volatile memory, EPROM, EEPROM, flash cards, or any memory common to computer platforms. Moreover, second memory 302 may comprise cloud storage, such as provided by a cloud storage service and/or a cloud connection service.

Further, first computing platform 300 also includes second processing device(s) 304, which may be an application-specific integrated circuit ("ASIC"), or other chipset, logic circuit, or other data processing device. Second processing device 304 may execute an application programming interface ("API") 306 that interfaces with any resident programs, such as multicast service metric data collection and extractions tool 310 and algorithms, sub-engines/routines associated therewith or the like stored in the second memory 302 of first computing platform 300.

Second processing device(s) 304 may include various processing subsystems (not shown in FIG. 3) embodied in hardware, firmware, software, and combinations thereof, that enable the functionality of first computing platform 300 and the operability of computing platform 300 on a distributed communication network 210. For example, processing subsystems allow for initiating and maintaining communications and exchanging data with other networked devices. For the disclosed aspects, processing subsystems of second processing device(s) 304 may include any subsystem used in conjunction with multicast service metric data collection and extractions tool 310 and related engines, routines, algorithms, sub-algorithms, modules, sub-modules thereof.

First computing platform 300 additionally includes a communications module (not shown in FIG. 3) embodied in hardware, firmware, software, and combinations thereof, that enables electronic communications between first computing platform 300 and other networks and/or networked devices, such as, distributed trust computing network 110, multicast messaging hosts 200, second computing platform 400 and the like. Thus, the communication module may include the requisite hardware, firmware, software and/or combinations thereof for establishing and maintaining a network communication connection with one or more systems, platforms, networks, or the like.

Figure 4:
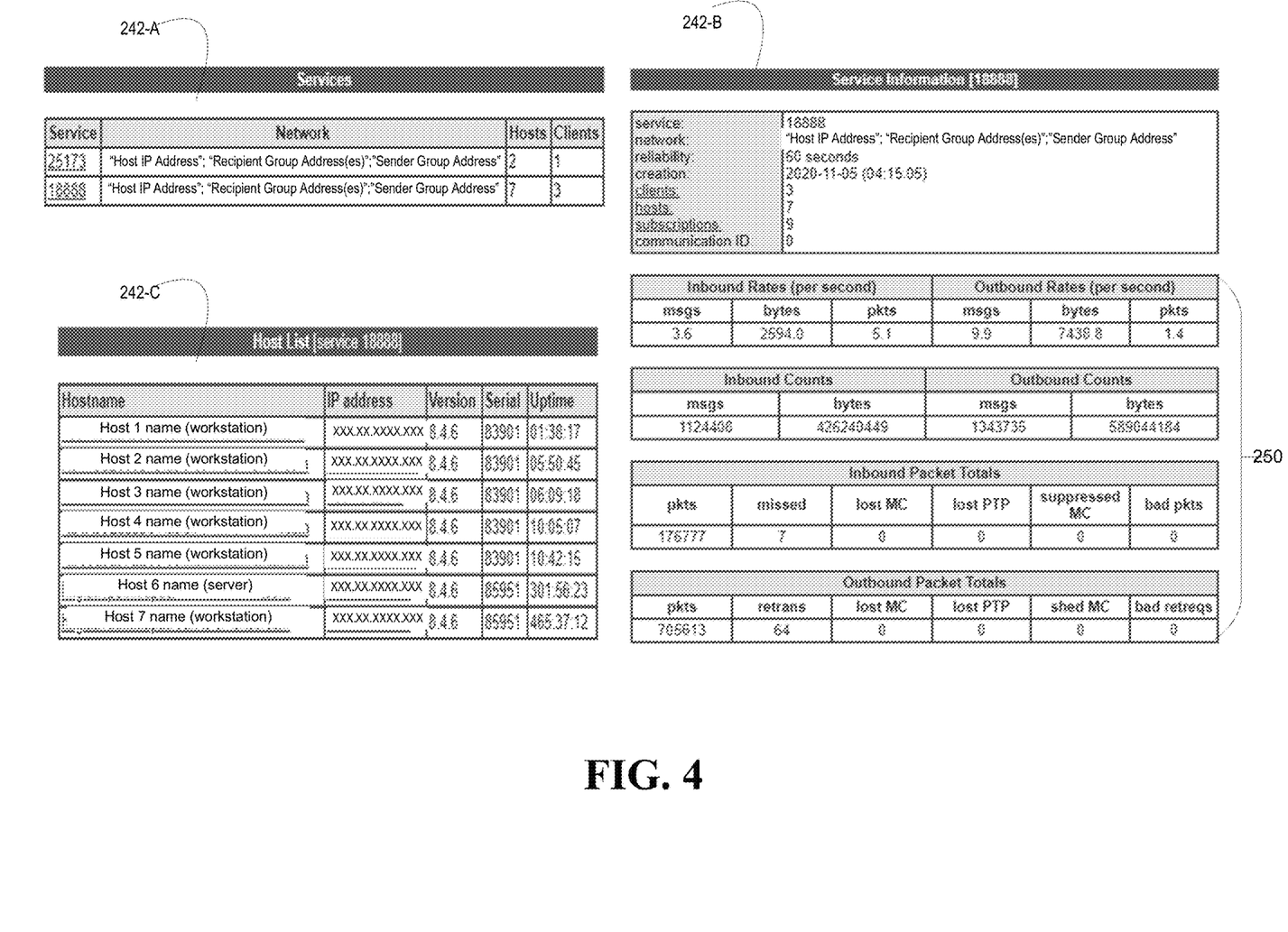
FIG. 4 is examples of multicast message metric data, specifically HTTP interface pages, in accordance with embodiments of the present invention.

Second memory 302 of first computing platform 300 stores multicast service metric data collection and extractions tool 310 that includes first instructions 320 which are configured to, poll (i.e., first poll 330) a predetermined subset of hosts 200-1 from amongst the plurality of multicast messaging hosts 200 for multicast message metric data 240. In specific embodiments of the invention, the predetermined subset of hosts 200-1 are the primary servers 200-3 as designated by the entity in control of the hosts 200. A primary server 200-3 is any server that is deemed to be instrumental in the multicast messaging network/scheme. As previous discussed, in specific embodiments of the invention, the multicast message metric data 240 is contained with HTTP interface pages 242. Examples of HTTP interfaces 242 are shown in FIG. 4 and discussed infra.

In response to receiving multicast messaging metric data 240 from one or more of the subset of hosts 200-1, first instructions 320 are further configured to scan 340 the multicast messaging metric data 240 to dynamically extract, along with other metrics, one or more multicast group addresses 230 and corresponding metrics 252 associated with each of the multicast group address(es) 230. In specific embodiments of the invention, in which the multicast message metric data 240 is contained with HTTP interface pages 242, the HTTP interface pages 242 are scanned to dynamically extract the one or more multicast group addresses. Specifically, the Services and/or Service Information HTTP interface pages may be scanned under the "network" heading/field to parse out the multicast group address(es) that a specified service is receiving or sending messages on. For example, in specific embodiments of the invention in which the "network" field comprising a first entry consisting of the IP address of the host, the second entry (separated by semi-colon) consists of one or more group multicast addresses being used to receive multicast messages and the third entry (separated by semi-colon) consists of a single group multicast address being used to send/transmit multicast messages.

In addition, first instructions 320 configured to scan 340 the multicast messaging metric data 240 are configured to dynamically identify one or more secondary hosts 200-2 from amongst the plurality of multicast messaging hosts 200 that are currently active (i.e., currently sending or receiving multicast messages). In specific embodiments of the invention, the secondary hosts 200-2 comprise non-primary servers 200-4 and workstations 200-5 (e.g., PCs, laptops or the like).

As a result of identification of secondary hosts 200-2, first instructions 320 are configured to construct 350 a polling queue 360 that consists of the predetermined subset of hosts 200-1 (e.g., the primary servers 200-3) and the identified secondary hosts 200-2 (e.g., active non-primary servers and workstations).

At a predetermined interval (e.g., once every 5 minutes or the like), first instructions 320 are configured to poll (i.e., second poll) the hosts 200 included in the polling queue 360 (i.e., the predetermined subset of hosts 200-1 and the identified secondary hosts 200-2) for multicast message metric data 240 (e.g., HTTP interface pages 242 that indicate an active service).

As previously discussed, the process of polling hosts 200 in the polling queue 360, scanning the multicast message metric data 240 returned from the polled hosts 200 and constructing the polling queue 360 occurs iteratively and continuously, such that new polling queues 360 are constantly being constructed that include the predetermined subset of hosts 200-1 and the secondary hosts 200-2 deemed to be currently active based on scanning the multicast messaging metric data 240 (e.g., HTTP interface pages 242) returned from the last-in-time polling process.

Referring to FIG. 4, shown are exemplary HTTP interface pages 242 collected as a result of the polling the hosts in a polling queue, in accordance with embodiments of the present invention. The HTPP interface pages include, but are not necessarily limited to, Services HTTP interface page 242-A, Services Information HTTTP Interface page 242-B and Host List HTTP Interface page 242-C. Services HTTP interface page 242-A lists the services that are currently active at a corresponding multicast daemon. If no services are currently active when the host/multicast daemon is polled, no HTTP interfaces pages 242 are returned. In certain instances, a service is synonymous with a transport or communication channel, which comprises a combination of a group address (either multicast or broadcast) and a service port (otherwise referred to as a User Datagram Protocol (UDP) port). While multiple services may share the same group address, each of the multiple services would have a different service port.

As shown in Services HTTP interface page 242-A, two services are active "25173" and "1888". The service HTTP interface page 242-A additionally lists the network on which the corresponding host is communicating and the quantity of hosts actively communicating on the service/communication channel and the quantity of clients (i.e., applications) communicating with the multicasting daemon (i.e., sending data for messages to the multicasting daemon over a Application Programming Interface (API). As previously discussed, during the scanning process the network field is scanned to extract the multicast group addresses from the network field. Specifically, as shown, the "network" field comprises a first entry consisting of the IP address of the host, the second entry (separated by semi-colon) consisting of one or more group multicast addresses being used to receive multicast messages and the third entry (separated by semi-colon) consisting of a single group multicast address being used to send/transmit multicast messages.

Services listed in the Services HTTP interface page 242-A include a hyperlink to a corresponding Service Information HTTP interface page 242-B. The service information listed in the Service Information HTTP interface page 242-B includes the service number, the network, the reliability of the service, the date and time the service was created, the quantity of clients/applications, the quantity of hosts, the quantity of subscriptions (i.e., message subjects) and quantity of communication identifiers. In addition, Service Information HTTP interface page 242-B includes the metrics 250 for corresponding service. The metrics 250 include the inbound and outbound communication rates (in seconds) for messages, bytes and data packets; the inbound and outbound counts/quantity of messages and bytes; inbound totals (reported by message receivers) for (i) data packets received, (ii) missed data packets, (iii) lost multicast data packets, (iv) lost point-to-point (i.e., TCP communication) data packets, (v) suppressed multicast data packets and (vi) bad/corrupt data packets, and outbound totals (reported by the message senders) for (i) data packets sent, (ii) retransmitted data packets, (iii) lost multicast data packets (iv) lost point-to-point data packets, (v) shed multicast data packets (i.e., quantity of data packet retransmission requests "ignored" from a "lossy" subscriber under re-transmission control) and (vi) bad retreqs data packets (i.e., quantity of unreadable retransmitted data packets).

It should be noted that in many multicast services, if data packets are dropped/lost during transmission, the sender is unaware of dropped/lost data packets and no transmission is possible. However, in other multicast services, means are provided for retransmitting missing data packets. In one such example, data packets are assigned sequence numbers and buffered at the sending host, such that if a receiving host fails to receive all the data packets in a sequence, a negative ACK message is communicated back to the sending host using the group address. The negative ACK includes the sequence numbers of the data packets that were not received. In response, the sending host can attempt to retransmit the data packets that were dropped/lost.

The Host field in the Service Information HTTP interface page 242-B includes a hyperlink to a corresponding Host List HTTP information page 242-C, which lists the currently active hosts (i.e., hosts currently sending or receiving messages via the service/multicast transport). In the illustrated example of FIG. 4, Host List HTTP information page 242-C lists under the field "Hostname" five workstations (name starting with a capital letter) and two servers (name starting with a lower-case letter). As a result of the scanning of Host List HTTP information page 242-C, the hosts are identified and workstations are added to the polling queue and, if the servers are determined to not be included in the listing of primary servers (i.e., the predetermined subset of host 200-1), the server(s) are added to the polling queue.

Referring to FIG. 5, an exemplary dashboard presentation 420 is depicted, in accordance with embodiments of the present invention. Dashboard presentation 420 includes pie charts which show the average inbound and outbound bytes (per second) broken down by transport/communication channel (i.e., group address and service port). In addition, dashboard presentation 420 includes graphical representations for inbound and outbound traffic of the number of bytes (upper graphs) and messages (lower graphs) per time unit (i.e., seconds) broken down by the same transports/communications channels shown in the pie charts.

Figure 6:
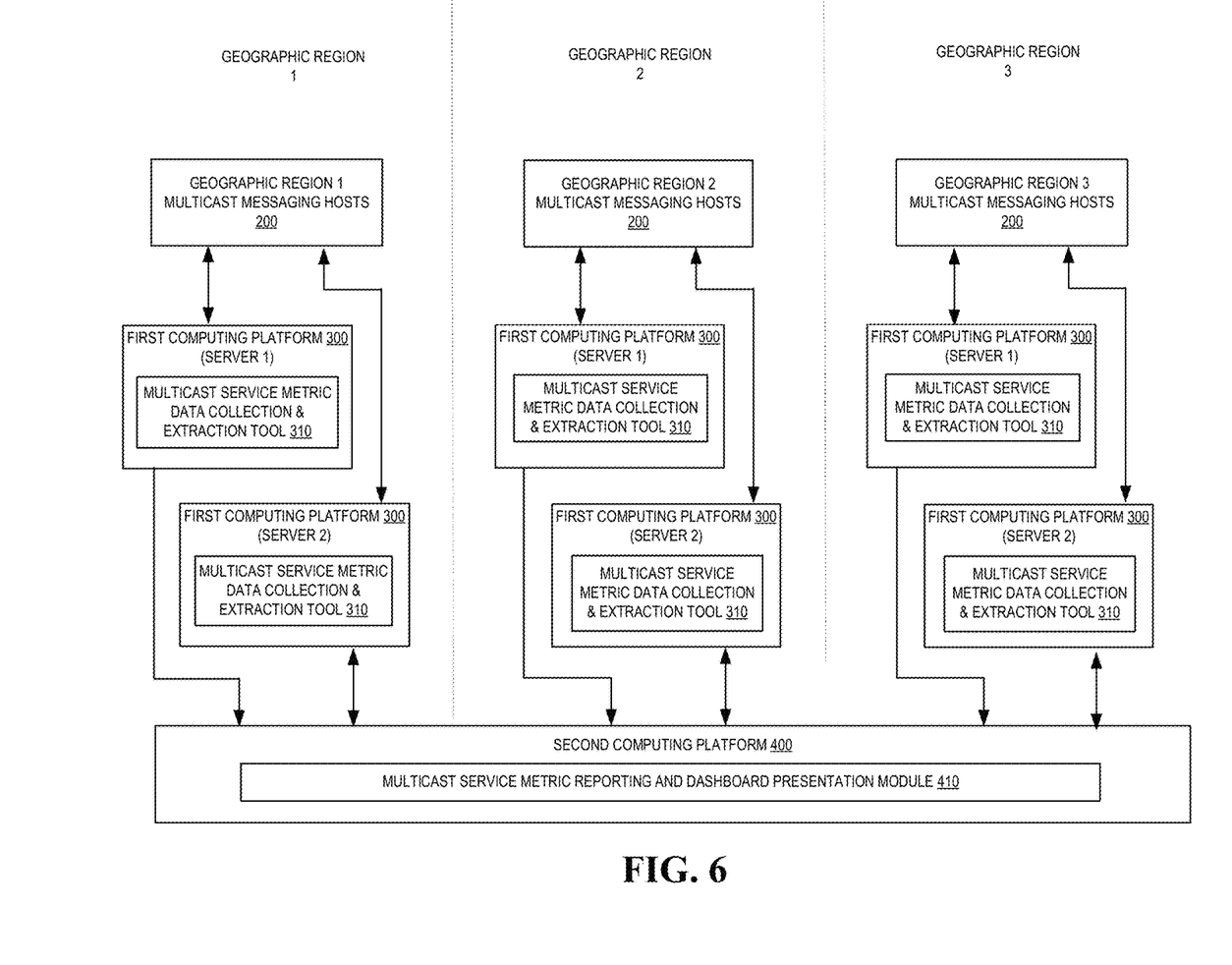
FIG. 6 is block/flow diagram depicting regional global implementation of multiple instances of the data collection and extraction tool for purposes of resiliency; in accordance with embodiments of the present invention.

Referring to FIG. 6 a block/flow diagram is depicted of a system 500 for multicast message metric data collection, extraction and dashboard presentation, in accordance with embodiments of the present invention. While embodiments of the invention specifically provide for a single instance of the multicast service metric data collection and extractions tool 310 to be executed for global polling of the inventory of hosts in the multicasting network, in the embodiment shown in FIG. 6, multiple instances of the multicast service metric data collection and extraction tool 310 are executed for purposes of efficiency and resiliency. Specifically, two instances (Server 1 and Server 2) of the multicast service metric data collection and extraction tool 310 in each of three geographic regions (geographic region 1, geographic region 2, and geographic region 3). Each geographic region may be defined by at least a portion of one or more continents and/or at least a portion of one or more countries. In order to maintain redundancy, each instance of the multicast service metric data collection and extraction tool 310 in a geographic region (geographic region 1, geographic region 2, and geographic region 3) will run at separate predetermined time intervals. This means that for an overall five-minute polling interval, the two instances/servers in a geographic region will poll the hosts in their region at 10-minute intervals, which are spaced five-minutes apart. Once the metric data (not shown in FIG. 6) is scanned for metrics by each instance of the data collection and extraction tool 310, the metrics are communicated to one centralized multicast service metric reporting and dashboard presentation module 410. In this regard, the centralized multicast service metric reporting and dashboard presentation module 410 consolidates the metrics for all multicasting services executing globally and provides unified reporting and dashboard presentations.

Figure 7:
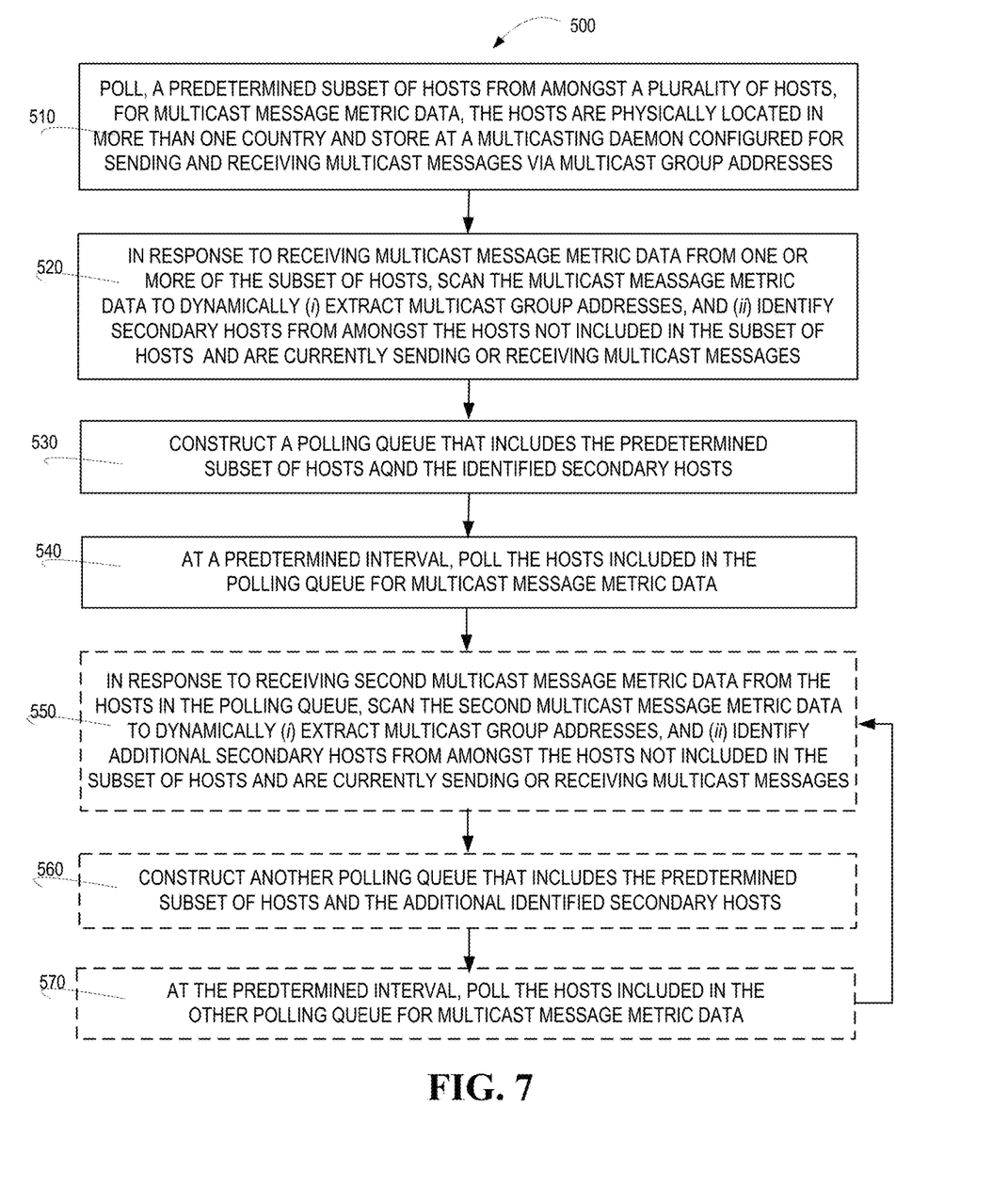
FIG. 7 is a flow diagram of a method for multicast messaging metric data capture and multicast metric extraction, in accordance with embodiments of the present invention.

Referring to FIG. 7, a flow diagram is depicted of a computer-implemented method 500 for collecting multicast messaging metric data from multicasting hosts/daemons and extracting metrics therefrom, in accordance with embodiments of the present invention. At Event 510, during an initial polling, a predetermined subset of all the hosts within a multicast network of hosts are polled for multicast metric data. The hosts that are polled are geographically located in more than one country, typically, multiple countries (i.e., globally) and store a multicasting daemon that is configured for sending and receiving multicast messages broadcasted via a multicast group address. As previously discussed, in specific embodiments of the invention, the predetermined subset of hosts may be those hosts deemed to be "primary" by the entity controlling the multicasting network.

In response to receiving multicast message metric data from one or more of the polled subset of hosts, at Event 520, the data is scanned to dynamically extract multicast group addresses and identify secondary hosts from amongst the hosts not included in the subset of hosts and which are currently active (i.e., sending or receiving multicast messages). The secondary hosts may include non-primary servers and workstations (PCs, laptops and the like). As previously discussed, in specific embodiments of the invention in which the metric data is contained within HTTP interface pages, the network field of the Service or Service Information HTTP interface page may be scanned to extract the group addresses. Further, secondary hosts may be identified by scanning the Host List HTTP interface pages for currently active hosts not included in the predetermined subset hosts (e.g., non-primary servers and/or workstations).

At Event 530, a polling queue is constructed that includes the predetermined subset of hosts, as well as, the identified secondary hosts and, at Event 540, at a predetermined interval (e.g., every 5 or 10 minutes), the hosts in the polling queue are polled for multicast message metric data.

Events 550-570 emphasize that the process of polling the hosts, extracting metrics including multicast group addresses, identifying active secondary hosts, and construct polling queues is a continuous and iterative process that occurs once every predetermined time interval (e.g., once every 5 or 10 minutes or another time interval). For example, in response to receiving second multicast message metric data from one or more of the polled hosts in the polling queue, at Event 550, the second multicast data is scanned to dynamically extract multicast group addresses and identify secondary hosts from amongst the hosts not included in the subset of hosts and which are currently active.

At Event 560, another polling queue is constructed that includes the predetermined subset of hosts, as well as, the currently identified secondary hosts and, at Event 570, at a predetermined interval (e.g., every 5 or 10 minutes), the hosts in the other polling queue are polled for multicast message metric data. Subsequently, the method returns to Event 550 for iterative processing.

Thus, as described in detail above, present embodiments of the invention include systems, methods, computer program products and/or the like for a comprehensive system for capturing multicast messaging traffic volume and performance metrics across a global inventory of hosts. In this regard, the present invention may be configured such that only a single instance of the data capture and extraction tool is implemented across an enterprise's entire inventory of multicast messaging-configured hosts. Additionally, the present invention is capable of dynamically extracting multicast group addresses and corresponding metrics during the scanning of the captured traffic volume and performance data. Since the active multicast group addresses are extracted during the scan process, the invention eliminates the need for manual input of specified multicast group addresses and provides for dynamic presentation of metrics on a per multicast group address basis for all multicast group addresses extracted during the scanning process.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for capturing metric data within a multicast messaging service and extracting metrics, the system comprising;
   a plurality of hosts each including a first memory and one or more first processing devices in communication with the first memory, wherein the first memory stores one or more multicasting daemons, each multicasting daemon executable by at least one of the one or more first processing devices and configured to send and receive multicast messages via a multicast group address; and
   a first computing platform including a second memory and one or more second processing devices in communication with the second memory, wherein the second memory stores a multicast service metric data capture and extraction tool that includes first instructions that are executable by at least one of the one or more second processing devices and configured to:
      poll, a predetermined subset of hosts from amongst the plurality of hosts, for multicast message metric data,
      in response to receiving multicast message metric data from one or more of the subset of hosts, scan the multicast message metric data to dynamically to at least one of: (i) extract one or more multicast group addresses and corresponding metrics associated with each of the one or more multicast group addresses, and (ii) identify one or more secondary hosts from amongst the plurality of hosts that are not included in the predetermined subset of hosts and are currently sending or receiving multicast messages,
      construct a polling queue that includes the predetermined subset of hosts and the one or more secondary hosts, and
      at selected times, poll the predetermined subset of hosts and the one or more secondary hosts included in the polling queue for multicast message metric data.

2. The system of claim 1, wherein the first instructions are further to iteratively:
   in response to receiving second multicast message metric data from one or more of the hosts included in the polling queue, scan the second multicast message metric data to dynamically (i) extract one or more multicast group addresses and corresponding metrics associated with each of the one or more multicast group addresses, and (ii) identify one or more secondary hosts from amongst the plurality of hosts that are not included in the predetermined subset of hosts and are currently sending or receiving multicast messages,
   construct another polling queue that includes the predetermined subset of hosts and the one or more secondary hosts, and
   at selected times, poll the predetermined subset of hosts and the one or more secondary hosts included in the other polling queue for multicast message metric data.

3. The system of claim 1, wherein the first instructions configured to (i) poll the predetermined subset of hosts defines the predetermined subset of hosts as primary servers, (ii) scan the multicast metric data to dynamically identify one or more secondary hosts defines the secondary hosts as non-primary servers and workstations.

4. The system of claim 1, wherein the first instructions configured to poll the hosts for multicast metric data are further configured to check for and retrieve Hypertext Transfer Protocol (HTTP) interface pages within the multicasting daemon that indicate one or more active services.

5. The system of claim 4, wherein the first instructions configured to scan the multicast message metric data are further configured to scan Service, Service Information and Host List HTTP interface pages retrieved from the multicasting daemons that indicated one or more active services.

6. The system of claim 1, wherein the corresponding metrics associated with each of the one or more multicast group addresses include one or more of (i) inbound rates for receiving messages, (ii) outbound rates for sending messages, (iii) inbound message and bytes counts, (iv) outbound message and byte counts, (v) inbound data packet totals, and (vi) outbound data packet totals.

7. The system of claim 1, further comprising a second computing platform including a third memory and one or more third processing devices in communication with the third memory, wherein the third memory stores a multicast service metric reporting and dashboard presentation module that includes second instructions that are executable by at least one of the one or more second processing devices and configured to:
   receive the multicast message metric data including the extracted one or more multicast group addresses and corresponding metrics associated with each of the one or more multicast group addresses, and
   build a dashboard presentation that provides for multicast message metric data to be displayed on a (i) per multicast group address basis, (ii) per service basis, (iii) per multicast daemon basis, and (iv) per host basis.

8. The system of claim 7, wherein the second instructions configured to build the dashboard presentation are further configured to build the dashboard presentation that provides for a graphical representation of the average and total inbound and outbound bytes per time interval on a (i) per multicast group address basis, (ii) per service basis, (iii) per multicast daemon basis, and (iv) per host basis.

9. A computer-implemented method for capturing metric data within a multicast messaging service and extracting metrics, the computer-implemented method is executed by one or more processing devices and comprising;
  polling, a predetermined subset of hosts from amongst a plurality of hosts, for multicast message metric data and storing at least one multicasting daemon configured for sending and receiving multicast messages via a multicast group address;
  in response to receiving multicast message metric data from one or more of the subset of hosts, scanning the multicast message metric data to dynamically to at least one of: (i) extract one or more multicast group addresses and corresponding metrics associated with each of the one or more multicast group addresses, and (ii) identify one or more secondary hosts from amongst the plurality of hosts that are not included in the predetermined subset of hosts and are currently sending or receiving multicast messages;
  constructing a polling queue that includes the predetermined subset of hosts and the one or more secondary hosts; and
  at selected times, polling the predetermined subset of hosts and the one or more secondary hosts included in the polling queue for multicast message metric data.

10. The computer-implemented method of claim 9, further comprising:
  iteratively performing:
    in response to receiving second multicast message metric data from one or more of the hosts included in the polling queue, scanning the second multicast message metric data to dynamically (i) extract one or more multicast group addresses and corresponding metrics associated with each of the one or more multicast group addresses, and (ii) identify one or more secondary hosts from amongst the plurality of hosts that are not included in the predetermined subset of hosts and are currently sending or receiving multicast messages;
    constructing another polling queue that includes the predetermined subset of hosts and the one or more secondary hosts; and
    at selected times, polling the predetermined subset of hosts and the one or more secondary hosts included in the other polling queue for multicast message metric data.

11. The computer-implemented method of claim 9, wherein polling the predetermined subset of hosts further comprises polling the predetermined subset of hosts, wherein the predetermined subset of hosts are defined as predetermined primary servers, and wherein scanning the multicast metric data to dynamically identify one or more secondary hosts further comprises scanning the multicast metric data to dynamically identify one or more secondary hosts, wherein the one or more secondary hosts are defined as non-primary servers and workstations.

12. The computer-implemented method of claim 9, wherein polling the predetermined subset of hosts of the plurality of hosts for multicast metric data further comprises checking for, within the multicasting daemon of the subset of hosts, and retrieving Hypertext Transfer Protocol (HTTP) interface pages that indicate an active service and wherein polling the hosts included in the other polling queue for multicast message metric data further comprises checking for, within the multicasting daemon of the hosts included in the polling queue, and retrieving Hypertext Transfer Protocol (HTTP) interface pages that indicate an active service.

13. The computer-implemented method of claim 12, wherein scanning the multicast message metric data further comprises scanning Service, Service Information and Host List HTTP interface pages retrieved from hosts having one or more active services.

14. The computer-implemented method of claim 9, wherein the corresponding metrics associated with each of the one or more multicast group addresses include one or more of (i) inbound rates for receiving messages, (ii) outbound rates for sending messages, (iii) inbound message and bytes counts, (iv) outbound message and byte counts, (v) inbound data packet totals, and (vi) outbound data packet totals.

15. The computer-implemented method of claim 9, further comprising:
  receive, at a dashboard module, the multicast message metric data including the extracted one or more multicast group addresses and corresponding metrics associated with each of the one or more multicast group addresses; and
  building, at the dashboard module, a dashboard presentation that provides for multicast message metric data to be displayed on a (i) per multicast group address basis, (ii) per service basis, (iii) per multicast daemon basis, and (iv) per host basis.

16. A computer program product including a non-transitory computer-readable medium, the non-transitory computer-readable medium comprising:
  a first set of codes for causing a computer to poll, a predetermined subset of hosts from amongst a plurality of hosts, for multicast message metric data, and store at least one multicasting daemon configured for sending and receiving multicast messages via a multicast group address;
  a second set of codes for causing a computer to, in response to receiving multicast message metric data from one or more of the subset of hosts, scan the multicast message metric data to dynamically to at least one of: (i) extract one or more multicast group addresses and corresponding metrics associated with each of the one or more multicast group addresses, and (ii) identify one or more secondary hosts from amongst the plurality of hosts that are not included in the predetermined subset of hosts and are currently sending or receiving multicast messages;
  a third set of codes for causing a computer to construct a polling queue that includes the predetermined subset of hosts and the one or more secondary hosts; and
  a fourth set of codes for causing a computer to, at selected times, polling the predetermined subset of hosts and the one or more secondary hosts included in the polling queue for multicast message metric data.

17. The computer program product of claim 16, wherein the second set of codes are further configured to cause the computer to, in response to receiving second multicast message metric data from one or more of the hosts included in the polling queue, scan the second multicast message metric data to dynamically (i) extract one or more multicast group addresses and corresponding metrics associated with each of the one or more multicast group addresses, and (ii) identify one or more secondary hosts from amongst the plurality of hosts that are not included in the predetermined subset of hosts and are currently sending or receiving multicast messages, and
  wherein the third set of codes are further configured to cause the computer to construct another polling queue that includes the predetermined subset of hosts and the one or more secondary hosts, and wherein the fourth set of codes are further configured to cause the computer to, at selected times, poll the predetermined subset of hosts and the one or more secondary hosts included in the other polling queue for multicast message metric data.

18. The computer program product of claim 16, wherein the first set of codes is further configured to cause the computer to poll the predetermined subset of hosts, wherein the subset are defined as predetermined primary servers, and wherein the second set of codes is further configured to cause the computer to scan the multicast metric data to dynamically identify one or more secondary hosts, wherein the one or more secondary hosts are defined as non-primary servers and workstations.

19. The computer program product of claim 16, wherein the first set of codes are further configured to cause the computer to check for, within the multicasting daemon, and retrieve Hypertext Transfer Protocol (HTTP) interface pages that indicate an active service and wherein the second set of codes are further configured to cause the computer to check for, within the multicasting daemon, and retrieve Hypertext Transfer Protocol (HTTP) interface pages that indicate an active service.

20. The computer program product of claim 19, wherein the second set of codes are further configured to cause the computer scan Service, Service Information and Host List HTTP interface pages retrieved from hosts having one or more active services.

* * * * *